Figure 15:
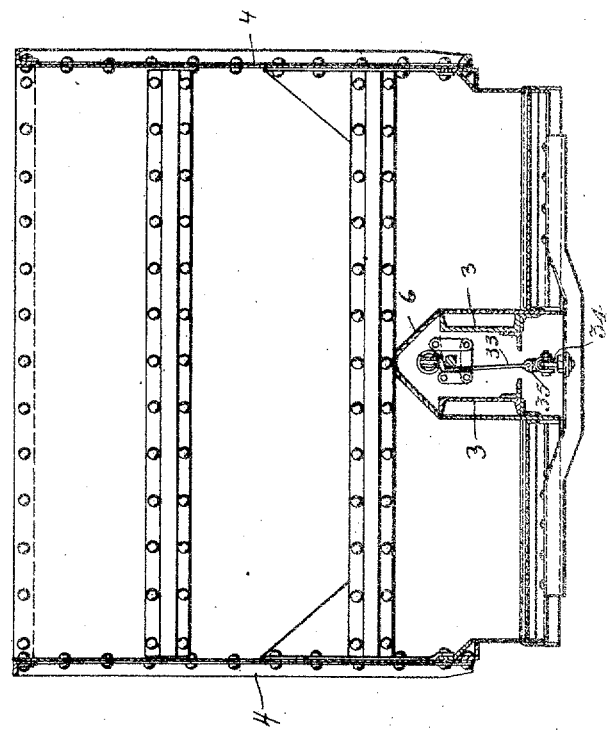

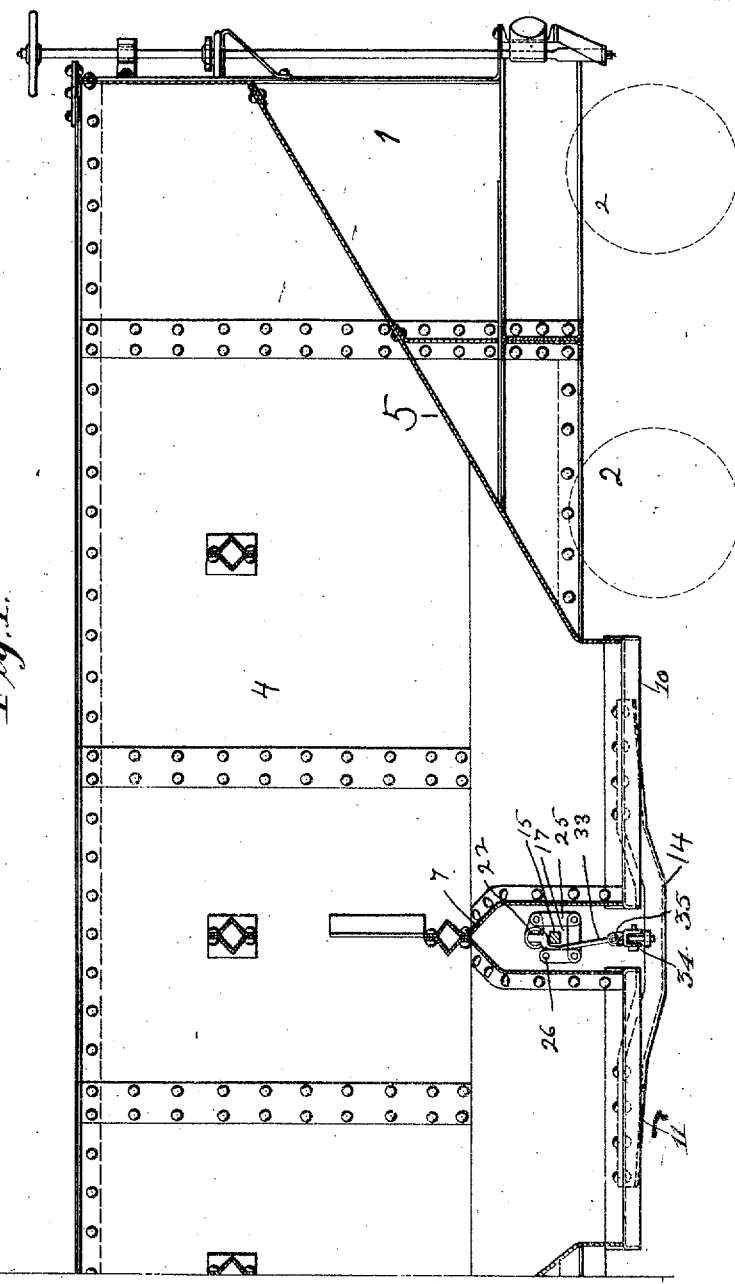

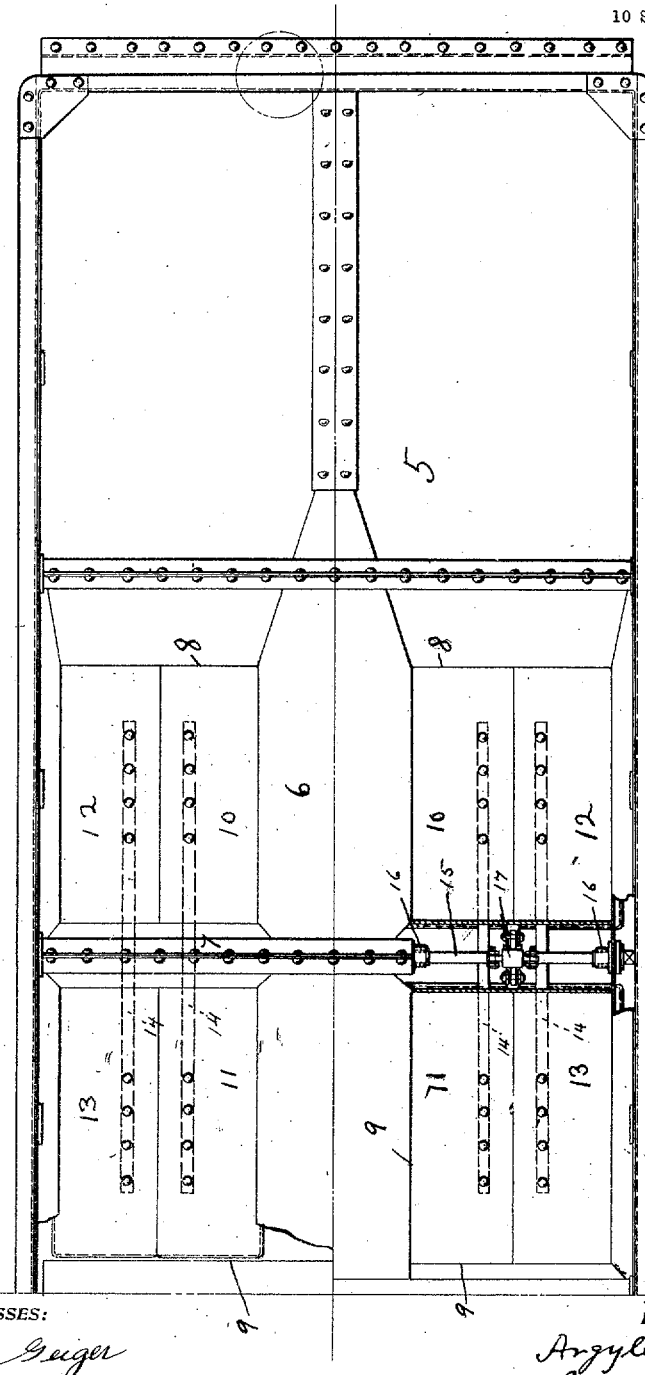

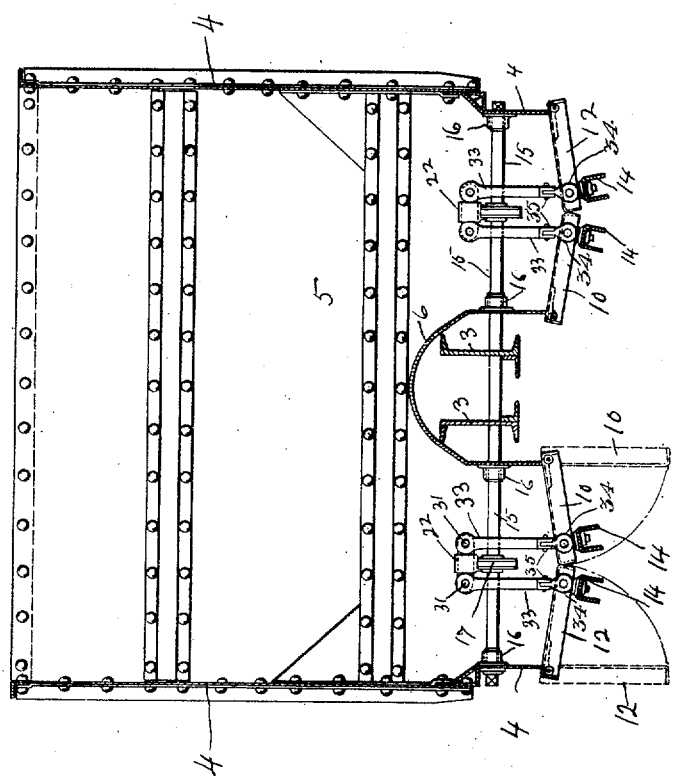

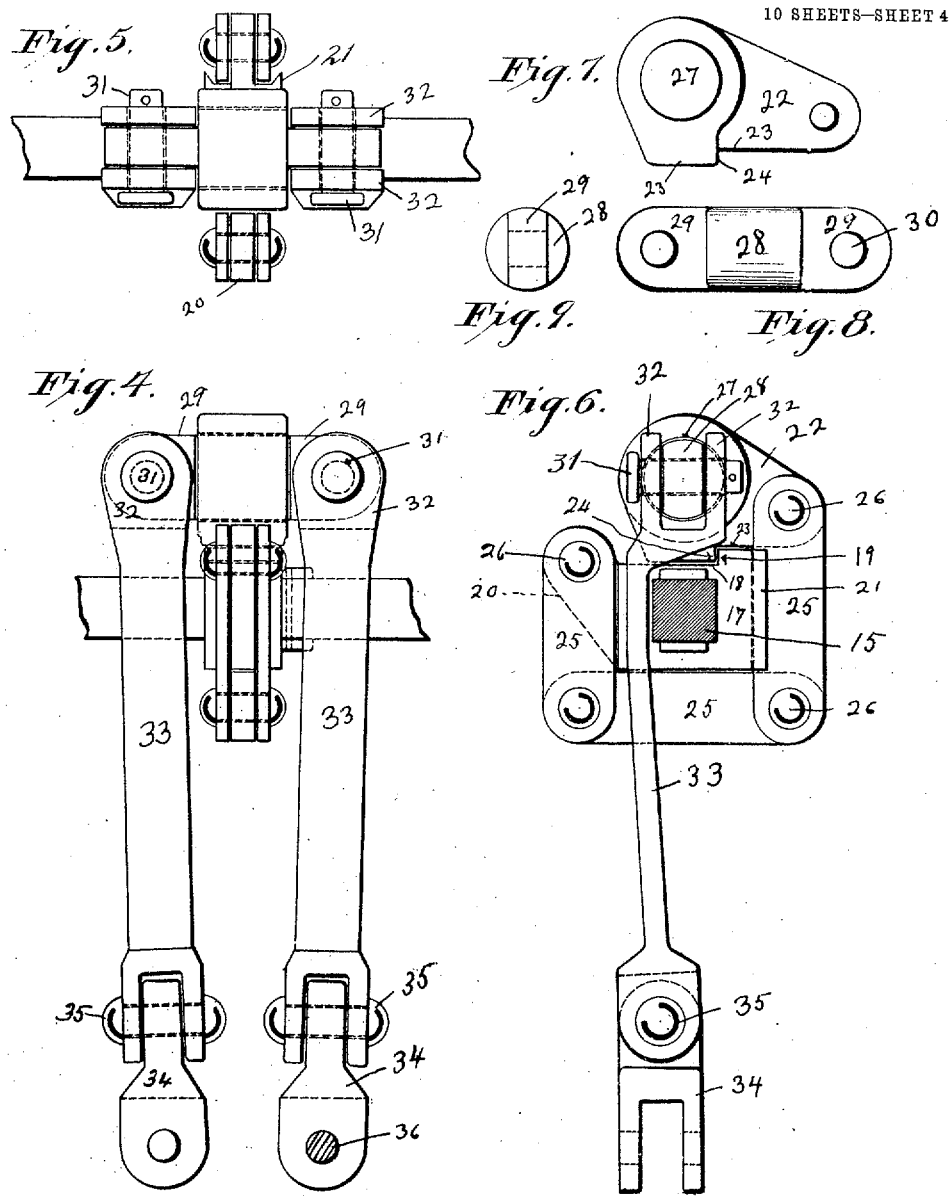

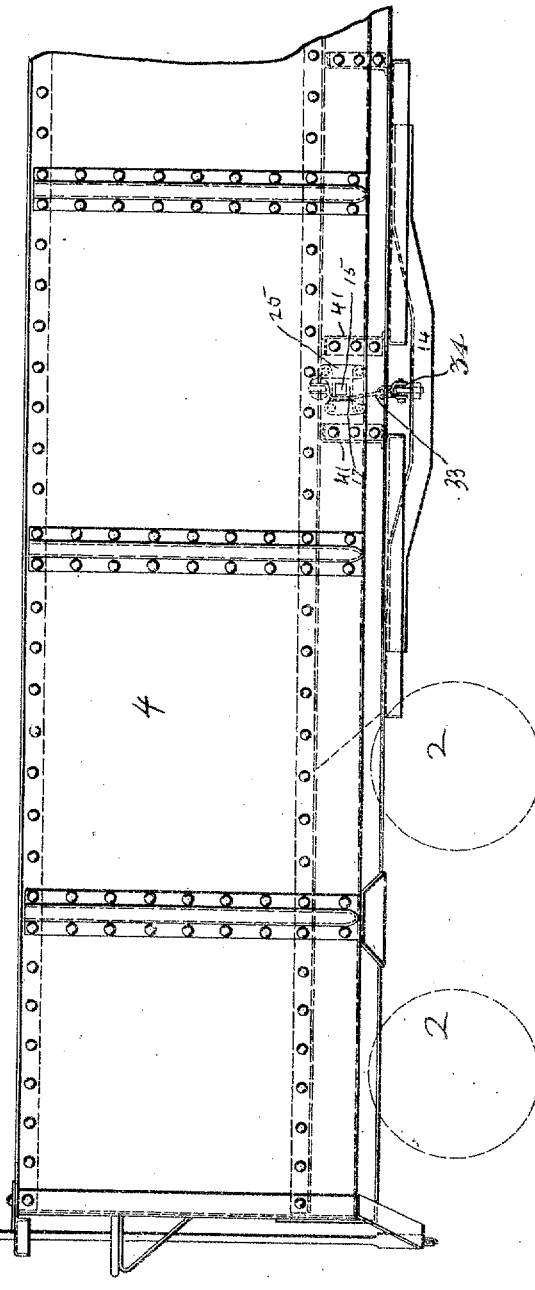

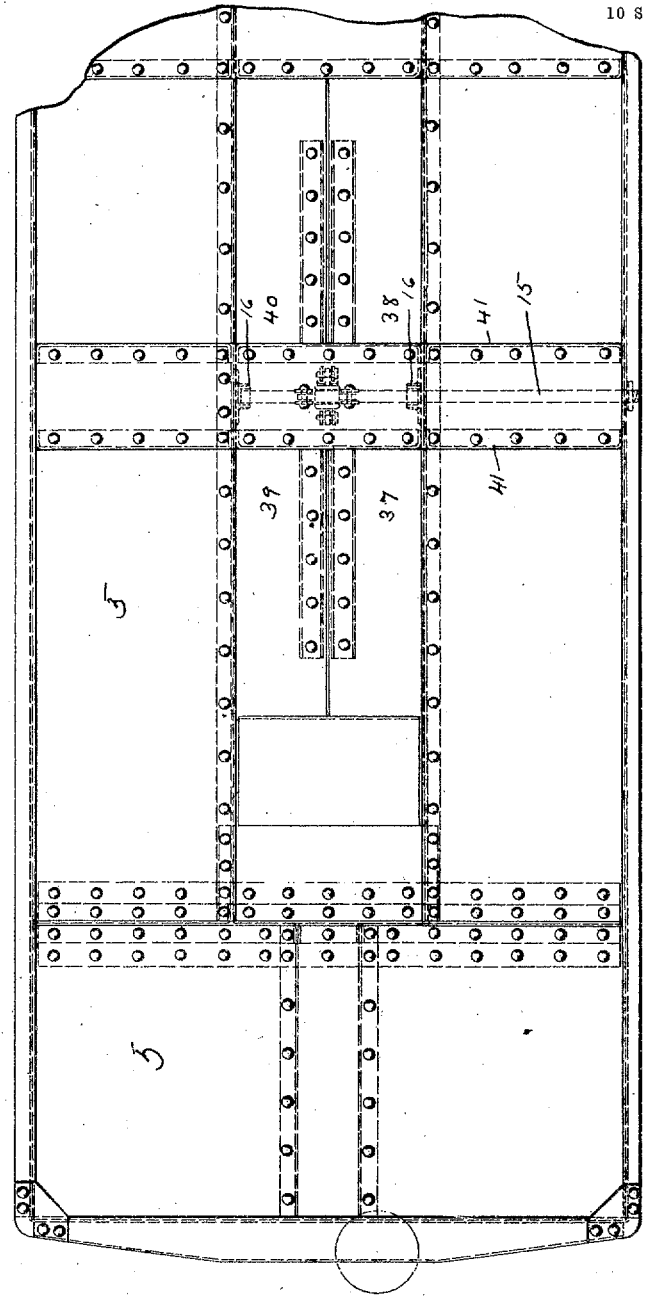

A. CAMPBELL.
DUMP CAR.
APPLICATION FILED DEC. 13, 1909.
973,753.
Patented Oct. 25, 1910.
10 SHEETS—SHEET 7.
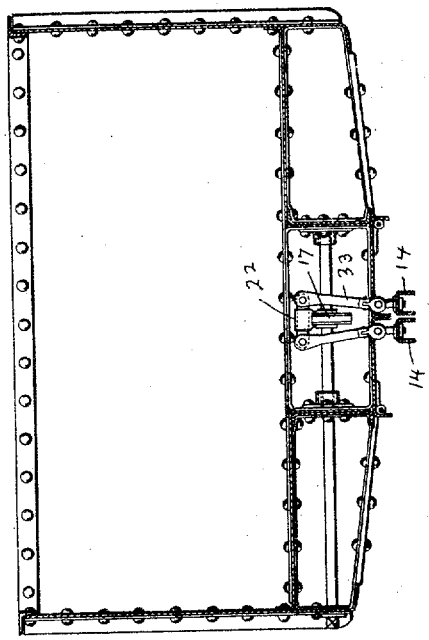
WITNESSES:
Wm. Geiger
Pearl Abrams.
INVENTOR
Argyle Campbell
BY
ATTORNEYS

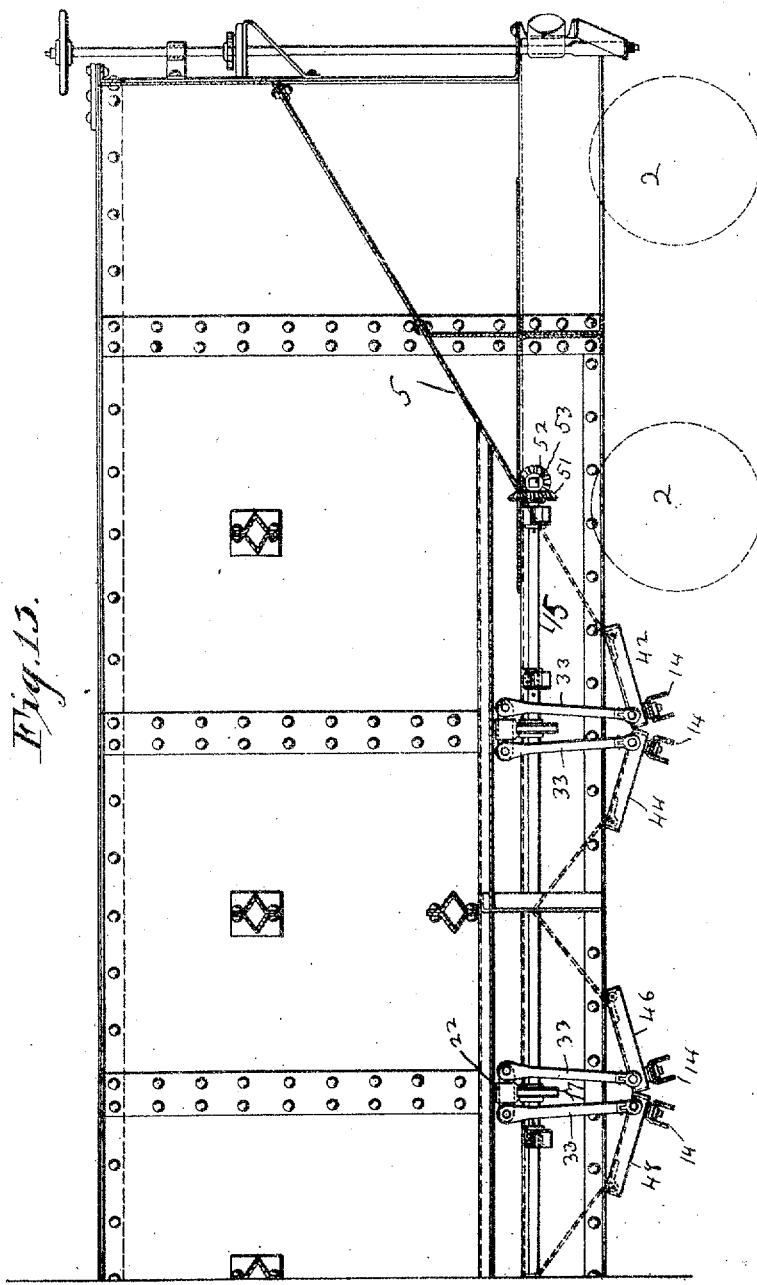

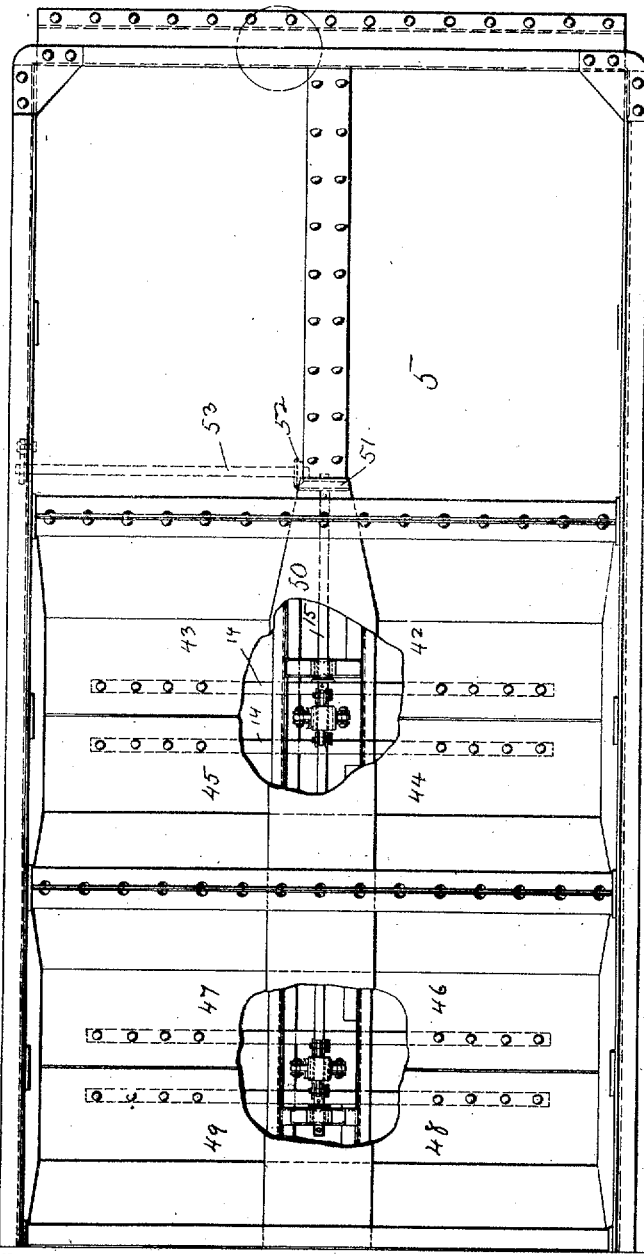

A. CAMPBELL.
DUMP CAR.
APPLICATION FILED DEC. 13, 1909.

973,753.

Patented Oct. 25, 1910.
10 SHEETS—SHEET 10.

WITNESSES:
Wm. Geiger
Pearl Abrams

INVENTOR
Argyle Campbell
BY Munday, Evarts,
Adcock & Clarke
his ATTORNEYS

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP-CAR.

973,753.  Specification of Letters Patent.  Patented Oct. 25, 1910.

Application filed December 13, 1909. Serial No. 532,826.

*To all whom it may concern:*

Be it known that I, ARGYLE CAMPBELL, a citizen of the United States, residing in Chicago, in the county of Cook and State of Illinois, have invented a new and useful Improvement in Dump-Cars, of which the following is a specification.

My invention relates to improvements in dump cars.

My invention consists in the novel construction of parts and devices and in the novel combinations and sub-combinations of parts and devices herein shown and described and more particularly specified in the claims.

In the accompanying drawing forming a part of this specification, Figure 1 is a side elevation of a dump car embodying my invention, one duplicate half of the car being omitted. Fig. 2 is a plan view of same. Fig. 3 is a vertical cross section. Fig. 4 is an enlarged detail elevation of the door operating mechanism. Fig. 5 is a top or plan view of same. Fig. 6 is a side view of same, showing the operating shaft in cross section. Fig. 7 is a detail view of the terminal or locking link of the door operating mechanism. Fig. 8 is a detail side view of the rotary supporting pin between the terminal link and the door supporting bar. Fig. 9 is an end view of said pin. Figs. 10, 11 and 12 are views similar to Figs. 1, 2 and 3 respectively, showing the application of my invention to a gondola car; and Figs. 13, 14 and 15 are views similar to Figs. 1, 2 and 3 respectively, showing the application of my invention to a hopper car in which the doors are hinged transversely instead of longitudinally, as in Figs. 1, 2 and 3.

In the drawing, 1 represents a dump car, 2 the wheels thereof, 3 the center sills, 4 the upright sides of the car body, 5 the floor or bottom, the same being preferably inclined or hopper shaped at the ends, 6 the longitudinal, central hopper sheet extending over the center sills, 7 transverse hopper sheets extending across the car between the door openings 8 and 9, 8 and 9 on each side of the central hopper sheet, and 10, 11, 12 and 13 are longitudinally hinged doors closing the door openings on each side of the central hopper sheet and between the transverse hopper sheets, the doors 10 and 11 being hinged at their inner, longitudinal edges adjacent to the center sills or central hopper sheet, and connected together by a bent bridge member 14 so that they may be operated together or as one door; and the doors 12, 13 being hinged at their outer longitudinal edges at or near the outer side of the car, and the doors 12, 13 being connected together by a bent bridge member 14 so that they may also be operated together or as one door. The doors 10, 12, and the doors 11, 13 meet together at their free or swinging edges, as will be readily understood from Figs. 2 and 3 of the drawing.

15 is the operating shaft of the door operating mechanism, the same extending as shown in Figs. 1, 2 and 3, transversely across the car under the transverse hopper sheet 7 and between the adjacent ends of the doors 10, 11 and 12, 13, the same having suitable bearings 16 in the central hopper sheet and in the car sides, and preferably extending through the center sills. The operating shaft is provided with two polygonal drums 17, each preferably four sided and having an upper or locking face or side 18, furnished with a shoulder or projection 19, and located above or in line with the meeting edges of the doors 10, 12 and 11, 13. Each of the drums 17 is further provided with a pivot lug 20 and with guides or flanges 21 on the side thereof opposite the pivot lug 20. The locking block or terminal link 22 has on its under face 23 a shoulder 24 adapted to interlock with and engage the shoulder 19 on the upper or locking face 18 of the drum 17. The locking block or terminal link 22 is flexibly connected to the drum 17 or its pivot lug 20 by connecting links 25, preferably three in number, and fitting and corresponding to three sides of the drum 17 while the locking block or terminal link 22 fits and corresponds to the remaining side thereof. The final link 25 is connected by a pivot pin 26 to the lug 20 of the drum 17 and similar pivot pins connect the several links with each other and with the locking block or terminal link 22.

The locking block or terminal link 22 is furnished with a central bore 27, the axis of which is directly above the axis of the operating shaft 15 when the doors are closed to receive the rotary supporting pin 28 which is cylindrical at its middle portion, and which is provided with two upright flat sided end portions 29, each furnished with an eye 30 to receive the connecting bolt 31, which passes through the jaws 32 of the door supporting bar 33, and which jaws 32 embrace the flat sided end 29 of the rotary supporting pin 28, thus affording a double or two-way rotary connection between the locking block 22 of the door operating mechanism, and each of the door supporting bars 33, one of which connects with the bridge member of the two connected doors. Each of the door supporting bars 33 has a double or two-way rotary connection with the bridge member 14 of the doors, this double or two-way rotary connection preferably consisting of a supplemental coupling 34 connected by a pivot 35 with the lower end of the supporting bar 33 and by a pivot 36 with the bridge member 14 of the doors. The four doors, on each side of the central hopper sheet are thus simultaneously operated by one and the same door operating mechanism. All eight doors on both sides of the central hopper sheet are also simultaneously operated from the same operating shaft 15.

In the modification illustrated in Figs. 10, 11 and 12, the construction of the door operating mechanism is the same as above described, these figures showing the application of the invention to a gondola car in which the dump doors 37, 38, 39 and 40 are longitudinally hinged and centrally arranged between the center sills, the door operating shaft 15 extending transversely to one side of the car between the transoms or transverse frame members 41 of the car.

In the modification illustrated in Figs. 13, 14 and 15, the construction of the door operating mechanism is the same as that above described, these figures showing the application of my invention to a dump car in which the doors 42, 43, 44, 45 and 46, 47, 48 and 49 are hinged or arranged transversely instead of longitudinally of the car. In this modification, the door operating shaft 15 extends longitudinally under the central hopper sheet 50, and it is provided with a bevel gear 51 at one end meshing with a bevel gear 52 on supplemental shaft 53 which extends out to the side of the car.

I claim:—

1. In a dump car, the combination of a dump car body having a longitudinally extending central hopper sheet and a transversely extending hopper sheet, and door openings on each side of said central hopper sheet and between which said transverse hopper sheet extends, inner and outer longitudinally hinged doors for closing each of said openings, bridge members connecting the inner doors, bridge members connecting the outer doors, a common operating shaft for all said doors extending transversely between the ends of adjacent doors under said transverse hopper sheet and provided with two polygonal winding drums, one on each side of said central hopper sheet, each of said winding drums having a shouldered locking face a locking block having a shouldered locking face engaging the shouldered locking face of each drum, and connecting links between said drum and locking block, said locking block having a rotary supporting pin extending through it, and a pair of supporting bars each having a pivotal connection with said rotary pin transversely thereto, each of said door supporting bars connecting with a bridge member of said doors, substantially as specified.

2. In a dump car, the combination of a dump car body having a longitudinally extending central hopper sheet and a transversely extending hopper sheet, and door openings on each side of said central hopper sheet and between which said transverse hopper sheet extends, inner and outer longitudinally hinged doors for closing each of said openings, bridge members connecting the inner doors, bridge members connecting the outer doors, a common operating shaft for all said doors extending transversely between the ends of adjacent doors under said transverse hopper sheet and provided with two polygonal winding drums, one on each side of said central hopper sheet, each of said winding drums having a shouldered locking face a locking block having a shouldered locking face engaging the shouldered locking face of the drum, and connecting links between said drum and locking block, said locking block having a rotary supporting pin extending through it, and a pair of supporting bars each having a pivotal connection with said rotary pin transversely thereto, each of said door supporting bars connecting with the bridge members of said doors, each of said supporting bars having a double or two-way pivotal connection with said bridge member, substantially as specified.

3. In a dump car, the combination with a door opening, of two doors hinged at their opposite edges and opening and closing together, of an operating shaft, a polygonal winding drum on said shaft having a shouldered locking face, a locking block having a shouldered locking face, connecting links between said locking block and drum, and a rotary supporting pin extending through said locking block with its axis directly above said operating shaft, and a pair of door supporting bars connected one to each of said doors and having a pivotal connection with said rotary supporting pin, substantially as specified.

4. In a dump car, the combination with a door opening, of two doors hinged at their opposite edges and opening and closing together, of an operating shaft, a polygonal winding drum on said shaft having a shouldered locking face, a locking block having a shouldered locking face, connecting links between said locking block and drum, and a rotary supporting pin extending through said locking block with its axis directly above said operating shaft, and a pair of door supporting bars connected one to each of said doors and having a pivotal connection with said rotary supporting pin, said pivotal connection being transverse to said swivel supporting pin, substantially as specified.

5. In a dump car, the combination with a door opening, of two doors hinged at their opposite edges and opening and closing together, of an operating shaft, a polygonal winding drum on said shaft having a shouldered locking face, connecting links between said locking block and drum, and a rotary supporting pin extending through said locking block with its axis directly above said operating shaft, and a pair of door supporting bars connected one to each of said doors and having a pivotal connection with said rotary supporting pin, each of said door supporting bars having a two-way pivotal connection with the door to which it is attached, substantially as specified.

6. In a dump car, the combination with a door opening, of two doors closing said opening, a door operating shaft having a polygonal drum, a locking block engaging one face of the drum, connecting links between said block and drum, a rotary supporting pin extending through said locking block and having flat sided end portions, door supporting bars having jaws embracing the flat sided ends of said rotary supporting pin and pivot pins connecting said supporting bars and swivel supporting pin, substantially as specified.

7. In a dump car, the combination with a dump car body having four door openings, two on each side of a central dividing member and two on each side of a transverse dividing member, inner and outer doors closing said openings, the inner doors on each side of the central dividing member being connected together by bridge members and the outer doors on each side of the central dividing member being connected together by bridge members, an operating shaft extending transversely between the doors connected by said bridge members and provided with a plurality of winding drums, each having a locking block, a rotary supporting pin extending through said block and door supporting bars connected to the opposite ends of each of said rotary supporting pins by pivot pins extending transversely through said rotary pin, substantially as specified.

8. In a dump car, the combination with a car bottom having four openings and eight doors closing said openings, of an operating shaft extending transversely of and over the doors and provided with two winding drums, one for operating each group of four doors, and connecting means between said drums and doors, substantially as specified.

ARGYLE CAMPBELL.

Witnesses:
EDMUND ADCOCK,
PEARL ABRAMS.